March 23, 1971  G. BRAUER ET AL  3,572,274

CARGO SHIP

Filed Feb. 24, 1969  8 Sheets-Sheet 1

Inventors
GEORG BRAUER, WERNER QUADE
GERHARD CHONE
ERNST JÜRGENSEN
By: Michael S. Striker
Attorney

March 23, 1971  G. BRAUER ET AL  3,572,274
CARGO SHIP

Filed Feb. 24, 1969  8 Sheets-Sheet 4

Inventors
GEORG BRAUER, WERNER QUADE
GERHARD CHONE
ERNST JURGENSEN
By Michael S. Stiker
Attorney March 23, 1971     G. BRAUER ET AL     3,572,274

CARGO SHIP

Filed Feb. 24, 1969     8 Sheets-Sheet 6

Inventors
GEORG BRAUER, VERNER OHDE
GERHARD CHOVE
ERNST JÜRGENSEN

March 23, 1971  G. BRAUER ET AL  3,572,274
CARGO SHIP

Filed Feb. 24, 1969  8 Sheets-Sheet 7

Inventors
GEORG BRAUER, WERNER QUADE
GERHARD CHOWE
ERNST JURGENSEN
By: Michael S. Striker
Attorney United States Patent Office 3,572,274
Patented Mar. 23, 1971

3,572,274
CARGO SHIP
Georg Brauer, Werner Quade, Gerhard Chone, and Ernst Jurgensen, Hamburg, Germany, assignors to Blohm & Voss AG and Demag-Kampnagel G.m.b.H., both of Hamburg, Germany
Filed Feb. 24, 1969, Ser. No. 801,318
Claims priority, application Germany, Feb. 23, 1968, P 15 56 460.0
Int. Cl. B63b 35/44
U.S. Cl. 114—43.5                    32 Claims

ABSTRACT OF THE DISCLOSURE

A barge carrier vessel wherein two rearwardly extending stern beams support an inflatable pontoon for lifting or lowering of barges. The pontoon is movable between loading and stowed positions by seaway compensating winches or cylinders. A portal crane is mounted on the deck for movement lengthwise of the hull to transport barges onto and from the pontoon when the latter is held in stowed position.

BACKGROUND OF THE INVENTION

The present invention relates to cargo ships in general, and more particularly to improvements in barge carriers, lighter carriers or analogous vessels for transport of auxiliary craft or other bulky cargo which must be picked up from or launched in rivers, lakes, canals or other waters.

Presently known cargo ships which are used as barge carriers have proved unsatisfactory because it is almost impossible to pick up or launch barges, lighters or other auxiliary craft in open waters (i.e., outside of quiet harbor waters) without damaging the auxiliary craft or the ship itself. This is due to movement of open waters, either because of currents or other influences. It was further found that it is practically impossible to pick up or deposit buoyant bodies, such as floating barges, directly from or onto open waters by way of portal cranes or analogous lifting devices, even when the movements of water are rather minor. It is necessary to employ effective means which compensate for the movement of seaway so as to permit a barge to be lifted above or launched in water without severe impacts. Provision must also be made to adapt comparatively heavy barges to rapid movements of the water surface.

The incorporation of seaway compensating devices into a portal crane is very difficult and not effective because of substantial rotating masses involved and the long times required for acceleration or deceleration of such masses. Attempts to employ swinging platforms, cross loaders and like auxiliary equipment have met with little success because such equipment cannot follow rapid movements of barges in moving waters. Most serious problems arise in connection with the launching and lifting of barges in currents (particularly ebb swell). It is necessary to consider vertical movements of the barge which are caused by the waves as well as the resulting lateral forces, the effects of currents, wind and/or others. This consumes much time so that the launching or lifting of barges in open waters constitutes a lengthy operation.

SUMMARY OF THE INVENTION

An object of our invention is to provide a cargo ship which is constructed and assembled in such a way that it can be employed for lifting or launching of barges, lighters, other auxiliary craft and/or analogous floating cargo without any damage to the cargo and/or to the ship itself.

Another object of the invention is to provide a ship which is equipped with means for rapidly launching or lifting auxiliary craft in quiet or rough waters, including canals, lakes, rivers and/or open seas.

A further object of the invention is to provide a cargo ship which can pick up or launch different types and/or sizes of floating cargo.

An additional object of the invention is to provide a cargo ship wherein the parts which are used for lifting of floating cargo can also serve as a means for launching such cargo in open waters.

Still another object of the invention is to provide a cargo ship which can be used for launching and/or lifting of presently known types of auxiliary craft, particularly barges, lighters or the like.

The invention is embodied in a cargo ship, particularly in a carrier for barges or other types of auxiliary craft, wherein the stern portion of the hull supports an inflatable and submersible pontoon for movement between a loading position in which the pontoon is floated or submerged in water and a stowed position in which the pontoon is located above the water surface, moving means preferably including one or more seaway compensating winches or hydraulic cylinder and piston assemblies for directly or indirectly moving the pontoon between stowed and loading positions, and lifting means preferably including a portal crane mounted on the deck of the hull for transferring cargo onto and from the pontoon when the latter is held in stowed position. In this way, the crane need not directly deposit barges or other floating cargo on open waters and the crane need not pick up such cargo from water. When the pontoon is moved to stowed position, it is not influenced by movement of the water so that the crane can readily transfer barges or other cargo between the deck and the raised pontoon. When the pontoon is moved to launching position, it is submerged in water and the barge is towed into the loading zone above the submerged pontoon. The pontoon is thereupon inflated so that its upper surface engages the bottom of the barge and the seaway compensating devices are operated to lift the pontoon to its stowed position while the barge is coupled or attracted to the pontoon, for example, by way of electromagnets which are energized in automatic response to engagement between the bottom of the barge and the load-supporting surface of the pontoon. The seaway compensating devices are designed to respond rapidly to wave motions of water in rivers, lakes, canals or open seas. The operation of such devices is assisted by the pontoon which can be inflated or flooded. This insures that, when a barge is floated on launching of the pontoon, the latter can be quickly disengaged from the floating barge by being flooded to descend below the barge and to enable a tug or another manipulating machine or vessel to remove the floated barge from the launching zone.

The novel features which are considered as characteristic of the invention are set forth in particular in the appended claims. The improved cargo ship itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Referring first to the embodiment of FIGS. 1 to 4, there is shown a cargo ship which comprises a body or hull 1. The stern portion of the hull 1 comprises two rearwardly projecting substantially horizontal hollow extensions or beams (hereinafter called spurs) 2 and 3 having a characteristic stern profile 5 (see FIG. 2). The deck 6 of the hull 1 has a hatch coaming 11 and supports two longitudinally extending guide rails 7 and 9 for the dollies 10a of a lifting device here shown as a portal crane 10 which extends transversely of the deck and is movable lengthwise thereof along the rails 7 and 9.

Figure 1:
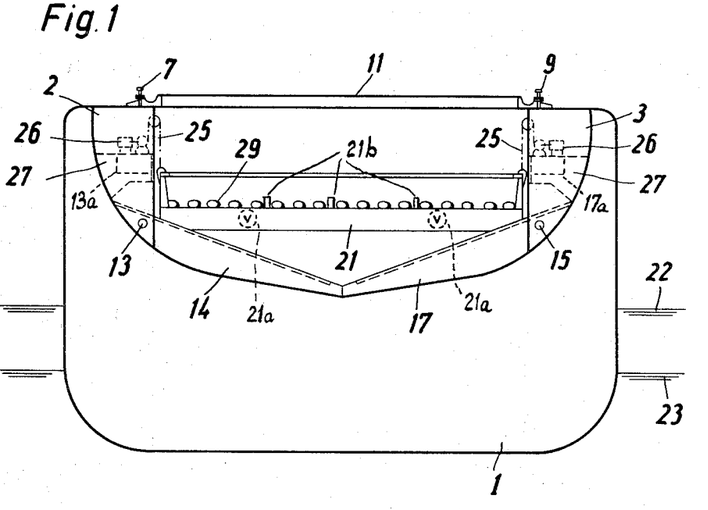
FIG. 1 is a rear elevational view of the stern portion of a cargo ship which embodies one form of our invention, the pontoon being shown in stowed position.

The stern portion further comprises two guide members or flaps 14, 17 which are respectively pivotable on horizontal shafts 13, 15 carried by the spurs 2 and 3. A drive means including the motors 14a, 17a shown in FIG. 1 is provided to pivot the flaps 14, 17 between the closed horizontal positions shown in FIG. 1 and open (vertical) positions shown in FIG. 2 whereby the flaps perform movements resembling those of the jaws of pliers. These flaps are formed with guide grooves or channels 18 which extend vertically when the flaps are moved to open positions to guide followers 19 provided on a vertically movable inflatable floating boat or pontoon 21. The latter is provided with one or more air valves 21a which can admit compressed air from an air compressor (not shown) to blow the pontoon. When the air is permitted to escape, the pontoon 21 can be flooded (i.e., its interior filled with water.

FIG. 1 illustrates the pontoon 21 in stowed or rest position well above the maximum load line 22 which indicates the water level when the vessel is loaded with cargo. The minimum load line is shown at 23. The flaps 14, 17 are held in their swung-in or closed positions to thus protect the stowed pontoon from rough seas.

Figure 2:
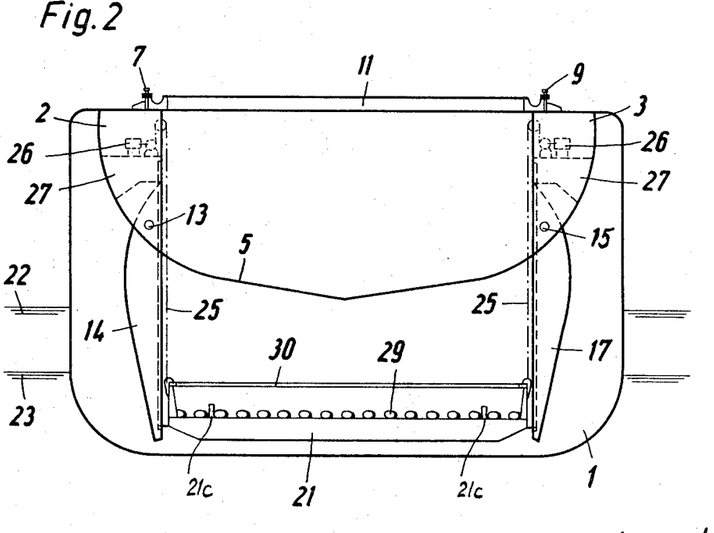
FIG. 2 is a similar rear elevational view but showing the pontoon in loading position.
Figure 3:
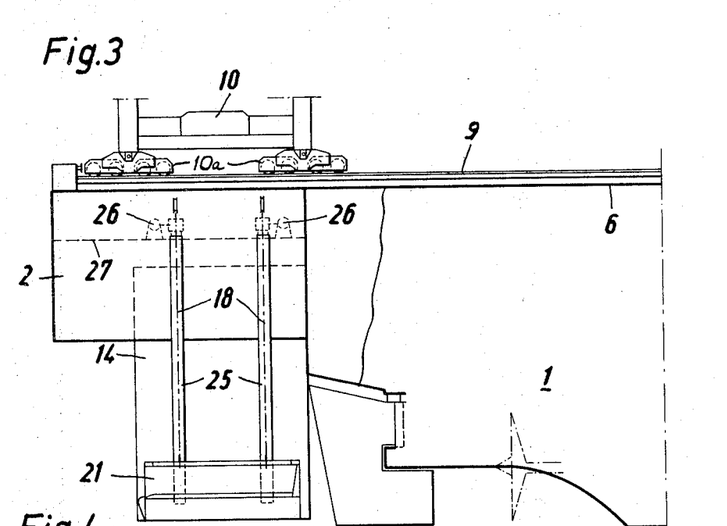
FIG. 3 is a side elevational view of the structure shown in FIG. 2, with the stern portion partly broken away.

FIG. 2 shows the pontoon 21 in launched or loading position. The flaps 14, 17 are held in open or vertical positions so that their channels 18 can properly guide the followers 19 during lowering of the pontoon 21 to loading position. The pontoon is ready to pick up a barge, not shown. The flaps 14, 17 then perform the additional function of shielding the loading zone from the effects of rough water. The moving means for lowering and raising the pontoon 21 comprises a set of flexible elements here shown as cables or chains 25 which are moved by seaway compensating winches 26. The ship is preferably equipped with two pairs of seaway compensating winches 26, one pair in each of the spurs 2 and 3. The numerals 27 denote carriers or holders for the winches 26; these holders are mounted in the interior of the respective spurs so that the winches are protected against external influences.

Figure 4:
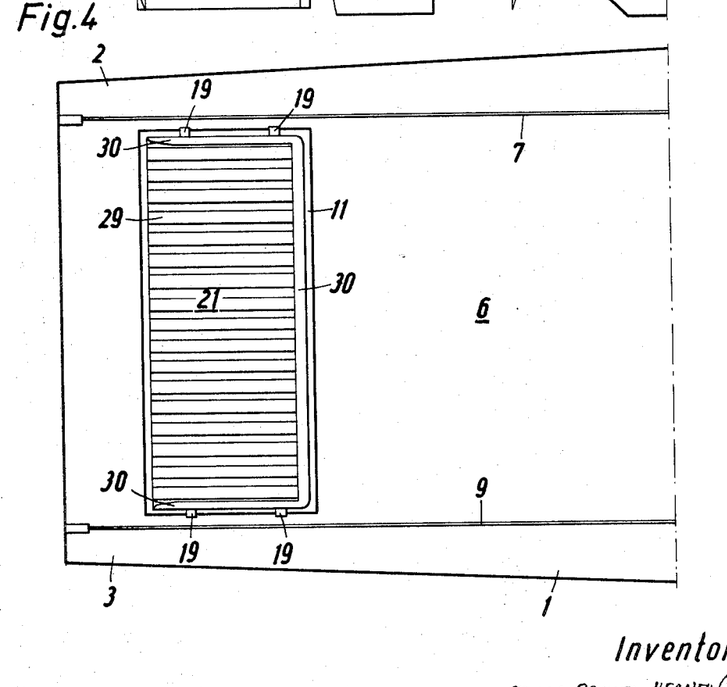
FIG. 4 is a top plan view of the structure shown in FIG. 1.
Figure 5:
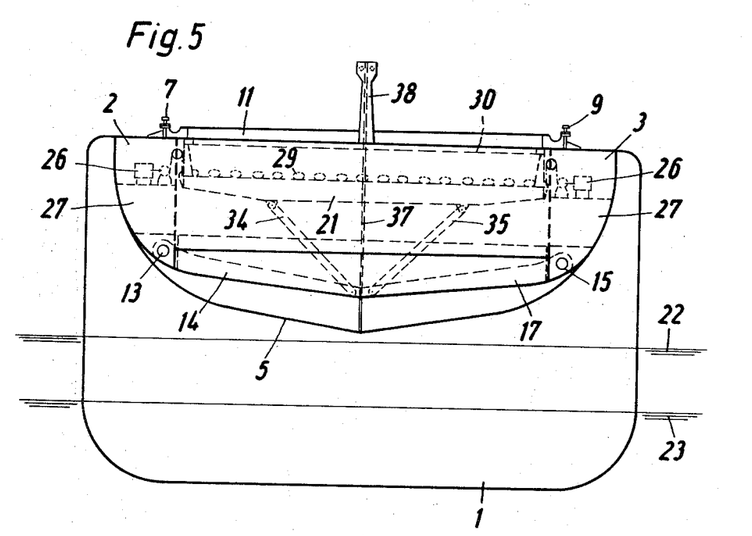
FIG. 5 is a rear elevational view of the stern portion of a second cargo ship, with the pontoon shown in stowed position.
Figure 6:
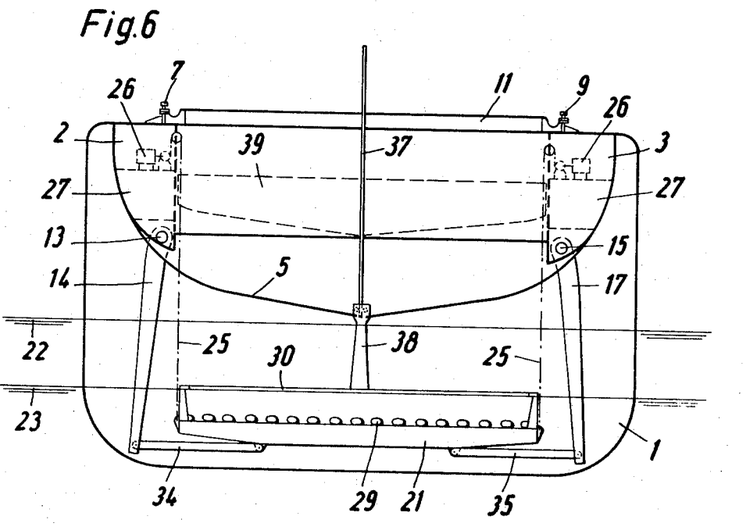
FIG. 6 is a similar rear elevational view but showing the pontoon of FIG. 5 in loading position.
Figures 7, 8:
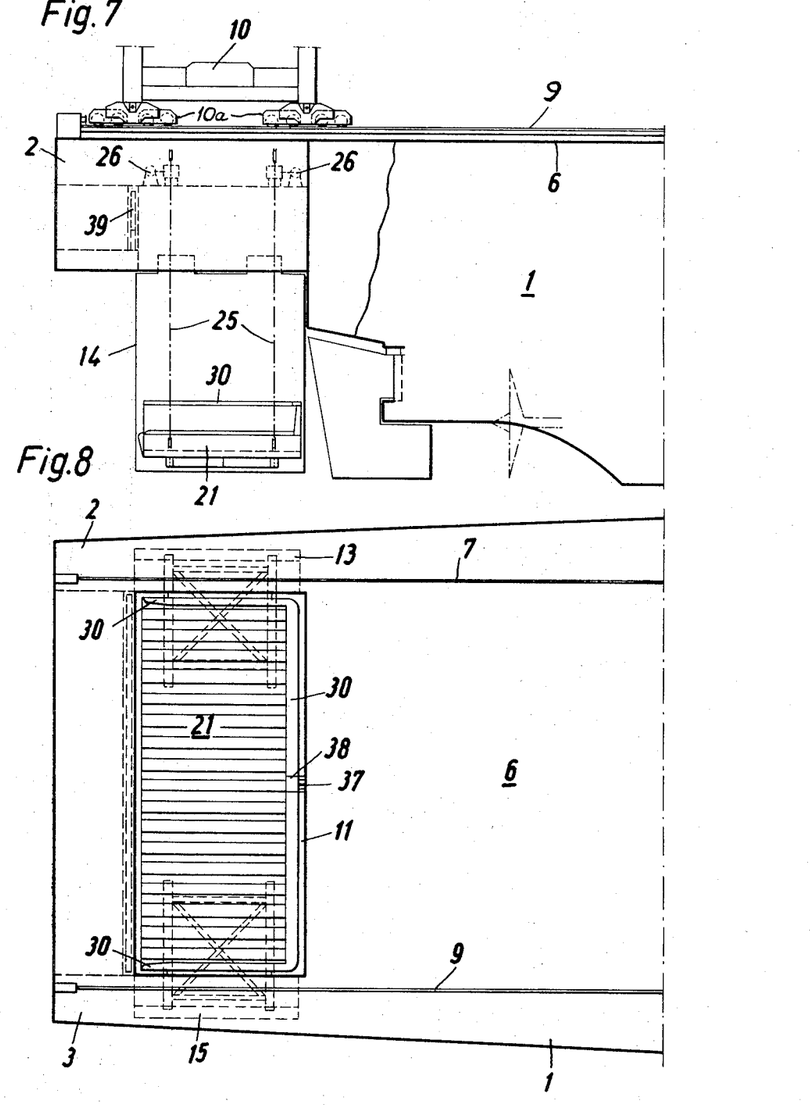
FIG. 7 is a side elevational view of the structure shown in FIG. 6, with the stern portion partly broken away.
FIG. 8 is a top plan view of the structure shown in FIG. 5.

The cargo-supporting surface of the pontoon 21 is provided with cushioning means including buffers 29 which consist of elastic material and extend over the full width of the pontoon, i.e., lengthwise of the hull 1. These buffers damp shocks which can be caused by rough seas when a barge is in the process of being picked up or launched by the pontoon. Furthermore, three sides of the pontoon 21 (namely, the two lateral sides and the front side) are provided with a shock rail 30 which consists of elastic or flexible (yieldable) material and serves as a fender to prevent damage to the barge and/or pontoon during loading or unloading of barges. FIG. 4 shows that the shock rail or fender 30 surrounds the major part of the load supporting surface on the pontoon 21.

The operation is as follows:

A barge (not shown) which floats in water at the open rear side of the pontoon 21 is maneuvered in such a way that one of its longer sides is adjacent to such open rear side. The pontoon is held in its loading position shown in FIGS. 2 and 3 and is submerged (flooded) sufficiently to enable a tug, tractor or other suitable manipulating machine or craft to pull or push the barge into the loading zone above the submerged pontoon 21. Compressed air is thereupon pumped into the pontoon through the valves 21a so that water is expelled and the pontoon receives a lift. The winches 26 are operated at a reduced power so that the pontoon 21 rises and its buffers 29 engage the bottom of the barge. It will be readily understood that, owing to buoyancy of the barge and pontoon, these parts are lifted at a speed corresponding to the water movement when the water level rises. As soon as the barge rests firmly on the buffers 29, the winches 26 are operated at full power and the pontoon 21 is lifted through the intermediary of chains 25. At the same time, the operators complete the circuits of electromagnets 21b provided at the bottom of the pontoon 21 and serving to couple or attract the barge to insure that the latter cannot be shifted during lifting into the range of the crane 10. It is preferred to provide the load supporting surface of the pontoon 21 with one or more push buttons 21c or analogous actuating devices which are engaged by the bottom of the barge and automatically complete the circuits of electromagnets 21b when the bottom of a barge comes to rest on the load supporting surface. The lifting of pontoon 21 by way of the cables 25 is terminated when the pontoon is raised above the water level so that its full weight (inclusive of the weight of the barge) is taken up by the winches 26. Thus, the pontoon is not influenced by movements of the water and is firmly held in position by the followers 19 which extend into the corresponding guide channels 18. These followers 19 cooperate with the guide members or flaps 14, 17 to hold the pontoon 21 against sidewise as well as against lengthwise movement. Lowering of the pontoon is prevented by the winches 26. The crane 10 is then operated to lift the barge off the pontoon 21 and to move it forwardly (lengthwise of the deck 6) and to stow it on board of ship in a desired position. Meanwhile, the pontoon 21 is free to descend and to pick up another barge. Upon lifting and stowing of the last barge, the pontoon 21 remains in the rest position of FIG. 1 and the motors 14a, 17a cause the flaps 14, 17 to reassume their closed positions.

Launching of barges which are stowed on board of ship is carried out in the following way: The crane 10 transports a barge onto the pontoon 21 which is held in the raised position of FIG. 1. The pontoon is held against downward movement by the winches 26 and against sidewise movement by the flaps 14, 17 which are held in open positions and cooperate with the followers 19. The winches 26 are then operated to lower the pontoon 21 with a barge thereon until the pontoon floats on a wave crest. Contact of the pontoon 21 with water is detected by a suitable detector (not shown) which initiates the generation of a signal serving to effect rapid flooding of the pontoon by permitting compressed air to escape. Air can escape by way of the valves 21a and/or by way of other outlets (not shown) which are sealable by flaps or the like. Flooding of the pontoon 21 insures that the barge is floated and that the pontoon is disengaged therefrom. The aforementioned detector also actuates the motors for the winches 26 which rapidly lower the flooded pontoon and thus deenergize the electromagnets 21b so that the barge is freed and can be towed or pushed away from the loading zone. This zone is then ready to receive another barge which is to be stowed on board or to permit raising of the pontoon 21 for floating of the next barge.

FIGS. 5 to 8 illustrate the stern portion of a second cargo ship. The aforementioned drive means 14a, 17a for the flaps 14, 17 is replaced by coupling rods or links 34, 35 which respectively connect the flaps 14, 17 with the pontoon 21. Each link is articulately connected to the pontoon and is hingedly connected to the respective flap. When the pontoon 21 is lowered by seeway compensating winches 26 to move from the rest position of FIG. 5 to the loading position of FIG. 6, the links 34, 35 mainly prevent swinging movements of the pontoon in longitudinal direction of the ship. Lateral movements of the pontoon 21 are prevented by an upright guide rail 37 which is mounted centrally at the stern and cooperates with one or more followers 38 of the pontoon. The guide rail 37 serves mainly to prevent lateral swaying of the pontoon 21 in stowed position so that a barge can be readily transferred onto or from the raised pontoon. It is further advisable to provide a folddown rear closure member 39 which protects the pontoon from rough seas in the stowed or rest position. The closure member 39 extends transversely between the upper portions of the spurs 2, 3 and is located rearwardly of the pontoon 21 when the latter assumes its stowed position. The manner in which the portal crane 10 is mounted on guide rails 7, 9 and the manner in which the seaway compensating winches 26 are mounted on holders or carriers 27 in the corresponding spurs 2 and 3 is the same as described in connection with FIGS. 1 to 4. The pontoon 21 is again provided with buffers 29, fender 30, valves (not shown) electromagnets (not shown), and knobs (not shown).

Referring now to FIGS. 9 to 12, there is shown a third cargo ship which does not require the flaps 14 and 17. The pontoon 21 can be raised or lowered through the intermediary of a supporting frame 41 which can be raised and lowered by way of flexible elements here shown as cables or link chains 42 connected to seaway compensating winches 26. The frame 41 has guide bars 45 which are slidable in ways 46 provided on the spurs 2 and 3 (see FIG. 11). The pontoon 21 is connected to the frame 41 by way of links 43.

The structure of FIGS. 9 to 12 is much simpler than the aforedescribed structures. However, lifting of the pontoon 21 requires increased operating power because, during lifting of a barge, both the barge and the supporting frame 41 must be moved so far out of water that the barge is free from seaway influences and can be stowed on board of ship by the portal crane 10.

Figure 9:
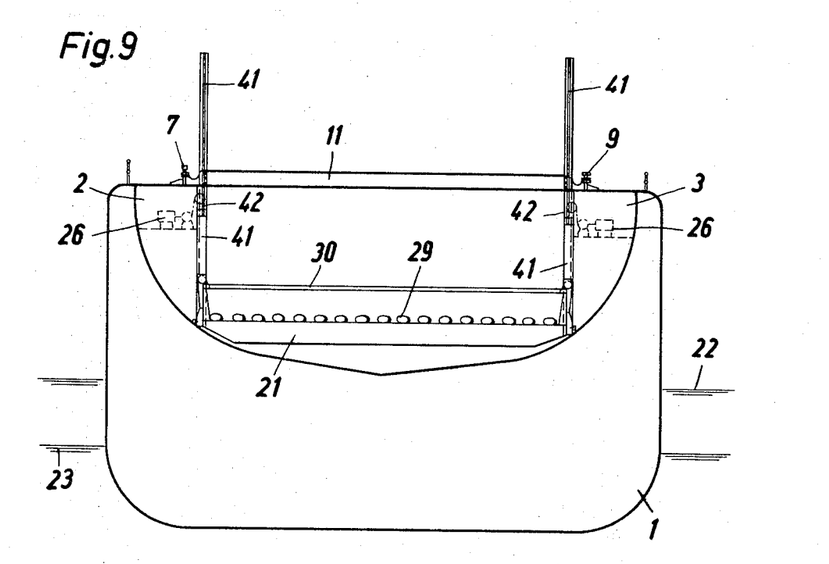
FIG. 9 is a rear elevational view of the stern portion of a third cargo ship, with the pontoon shown in stowed position.
Figure 10:
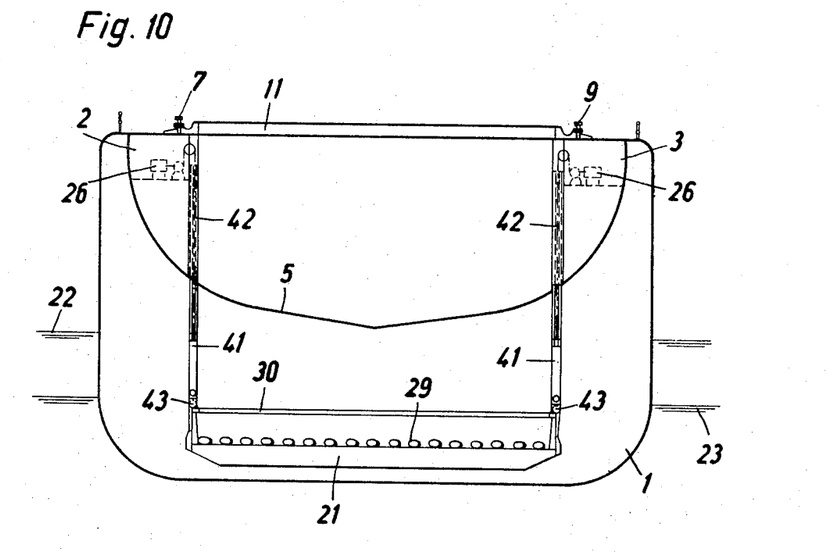
FIG. 10 is a similar rear elevational view but showing the pontoon of FIG. 8 in loading position.
Figures 11, 12:
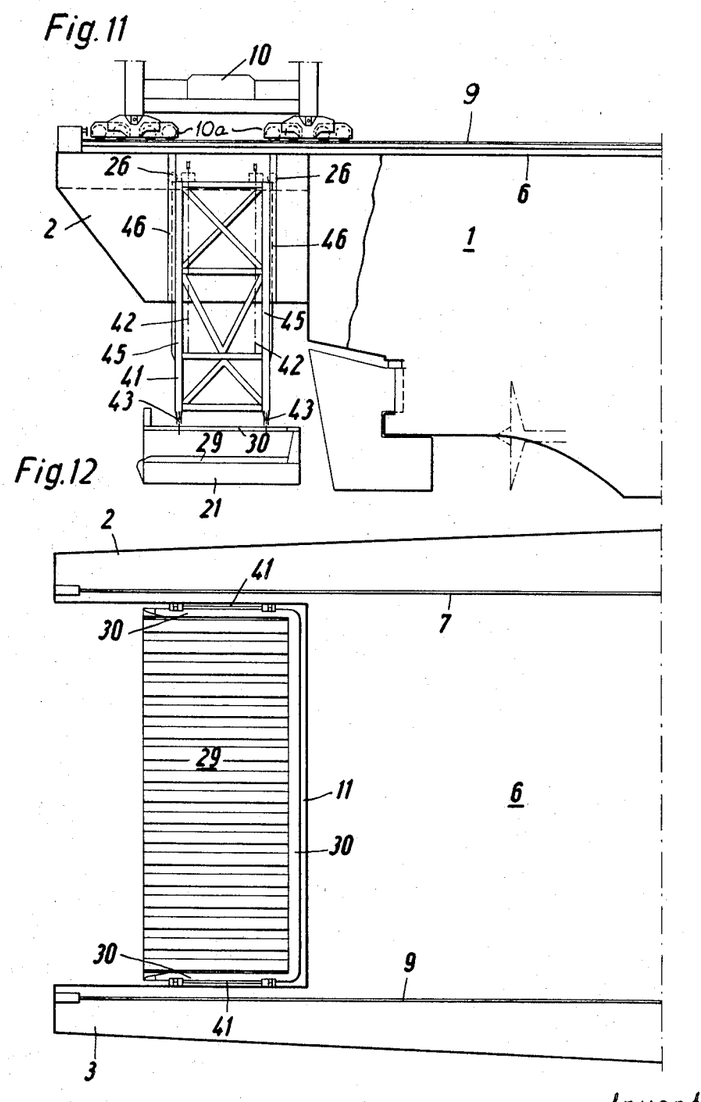
FIG. 11 is a side elevational view of the structure shown in FIG. 10, with the stern portion partly broken away.
FIG. 12 is a top plan view of the structure shown in FIG. 9.

The operation is as follows:

The pontoon 21 is lowered in the same way as described in connection with FIGS. 1 to 4 to move from the stowed or rest position of FIG. 9 in response to operation of the winches 26. When the pontoon reaches the loading position corresponding to the load line of the ship, the barge can be towed or pushed into the loading zone above the buffers 29. This can be accomplished by a tug. Compressed air is then blown into the pontoon so that it rises in the water and its buffers 29 engage the bottom of the barge which occupies the loading zone. At the same time, the electromagnets 21b (FIG. 1) are energized to attract the barge to the pontoon. When the pontoon 21 returns to the stowed position shown in FIG. 9, the crane 10 can pick up the barge and can transport it to the allocated part of the ship. The pontoon 21 cannot sway in the raised position because the frame 41 is guided by the bars 45 and ways 46. Movements of the crane 10 to pick up and transport the barge away from the raised pontoon 21 (or vice versa) can be controlled by automatic programming means of any known design, especially those movements which are needed to lift a barge off the raised pontoon so that the latter can return to its loading position to pick up the next barge.

Since the pontoon 21 is suspended on the links 43, i.e., not rigidly fixed to the frame 41, it can swing sideways with reference to the stern portion under the influence of waves which run transversely of the ship without overstressing the guide members 45 and ways 46. However, the links 43 hold the pontoon 21 against swaying in longitudinal direction of the ship.

Referring finally to FIGS. 13 to 16, there is shown the stern portion of a fourth cargo ship wherein the winches 26 are replaced by fluid-operated (preferably hydraulic) seaway compensating moving means for the pontoon 21. The supporting frame 41 of FIGS. 9–12 is replaced by a composite supporting frame including a main frame 47 and an auxiliary frame 49 which latter is slidable with reference to the main frame 47. The main frame can be releasably locked to the spurs 2, 3. These spurs have guides or ways 50 for controlling vertical movement of the main frame 47 which is adjustable with reference to such guides and can be fixed to the spurs in selected positions of adjustment depending on the water lever. The upright members of the frame 47 and the guides 50 are provided with rows of apertures or holes 51 which can receive automatically insertable and removable catch bolts to thus secure the main frame to the spurs. The auxiliary frame 49 can slide up and down in the main frame and carries the pontoon 21. This auxiliary frame 49 can also be fixed to the spurs 2, 3 and is coupled to the piston rods 54 whose pistons are reciprocable in double-acting seaway compensating hydraulic cylinders 53 mounted on the main frame 47. The cylinders 53 are mounted on the auxiliary frame 49 if the piston rods 54 are connected to the main frame 47.

The operation:

In the first step, the auxiliary frame 49 is unlocked so that it can be moved vertically with reference to the main frame 47. The main frame 47 remains locked to the spurs 2 and 3. The cylinders 53 then receive hydraulic fluid so that their piston rods 54 move the auxiliary frame 49 downwardly from the position shown in FIG. 13. The frame 49 is thereupon locked to the hull or to the spurs 2, 3 and the main frame 47 is unlocked. The cylinders 53 then receive hydraulic fluid to move the frame 47 downwardly with reference to the locked auxiliary frame 49. The main frame 47 is subsequently locked to the guides 50, the auxiliary frame 49 is unlocked and the cylinders 53 receive hydraulic fluid to move the auxiliary frame downwardly with reference to the main frame. The same procedures are repeated as often as necessary to move the pontoon 21 to the loading position.

A barge is then towed into the loading zone above the flooded pontoon 21 and the latter receives compressed air which expels water and causes the buffers 29 to move into engagement with the bottom of the barge in the loading zone. The electromagnets (not shown in FIGS. 13–16) are energized and attract the barge. The cylinders 53 are actuated again for the purpose of lifting the pontoon 21 to the stowed position shown in FIG. 13. Thus, the frame 47 is connected to the spurs 2, 3, when the piston rods 54 move the auxiliary frame 49 and the pontoon 21 upwardly, and the frame 49 is thereupon locked to the hull or to the spurs while the piston rods 54 lift the main frame 47.

Figure 13:
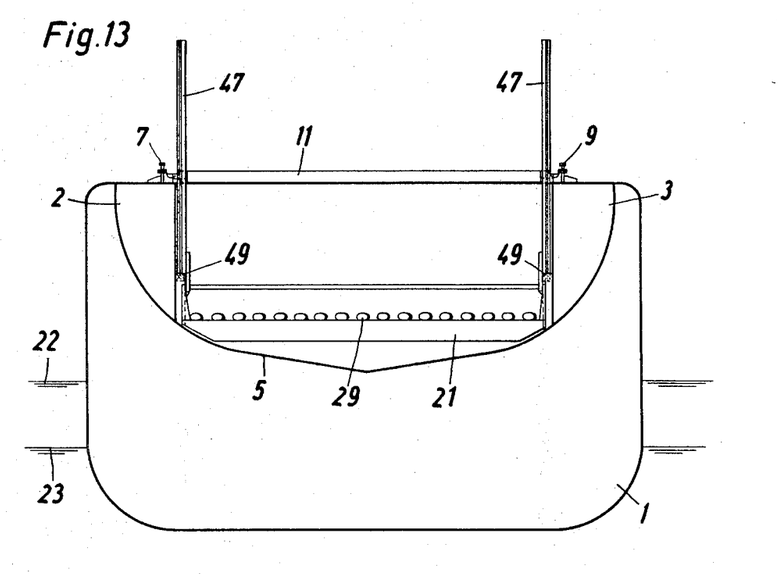
FIG. 13 is a rear elevational view of the stern portion of a fourth cargo ship, with the pontoon shown in stowed position.
Figure 14:
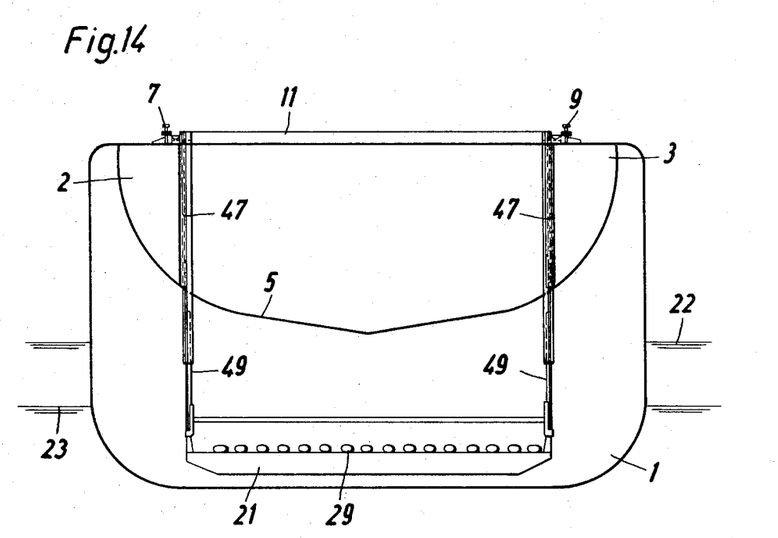
FIG. 14 is a similar rear elevational view, with the pontoon of FIG. 13 shown in loading position.
Figure 15:
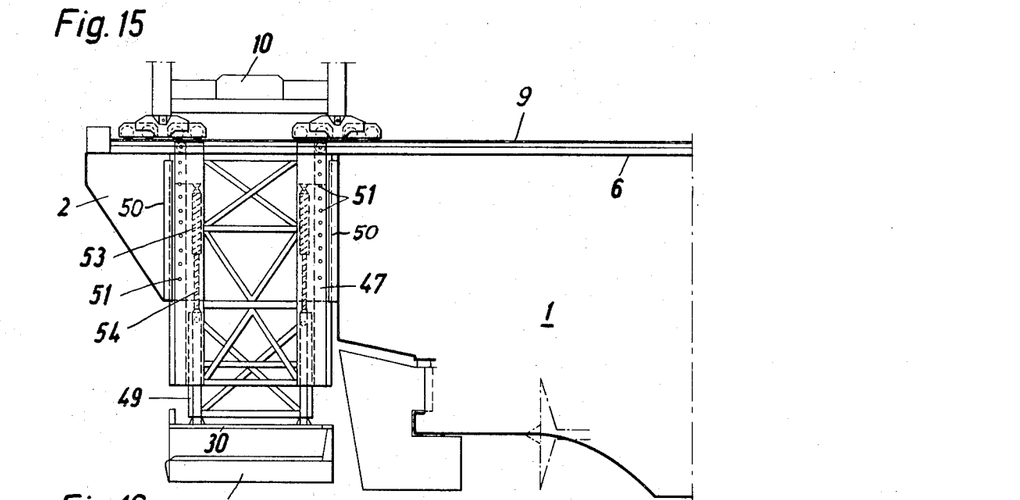
FIG. 15 is a side elevational view of the structure shown in FIG. 14, with the stern portion partly broken away.
Figure 16:
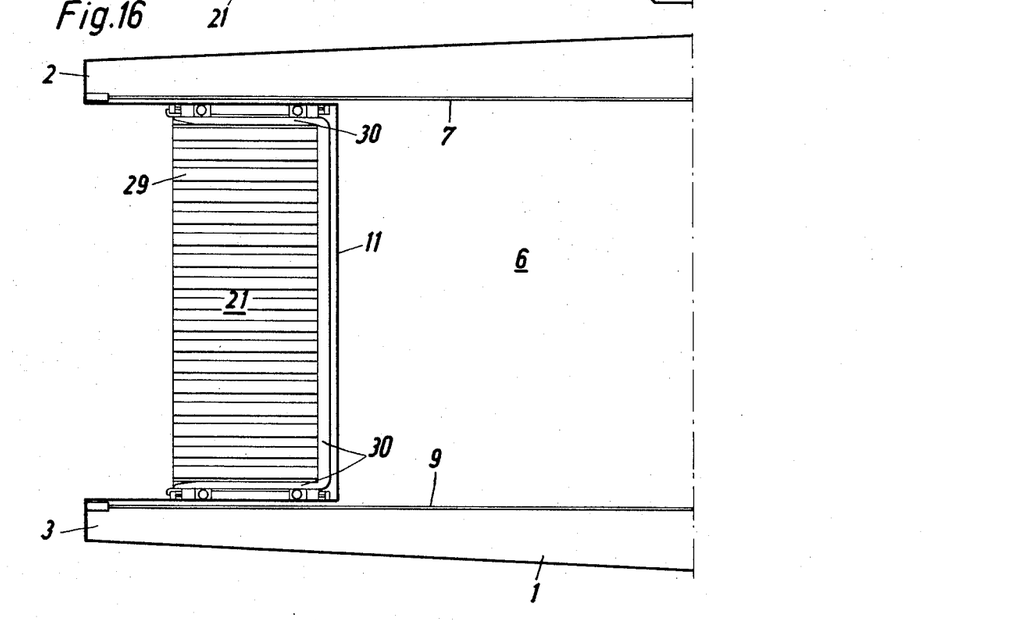
FIG. 16 is a top plan view of the structure shown in FIG. 13.

For lowering of barges, the pontoon 21 is moved to the raised position shown in FIG. 13. The crane 10 then deposits a barge on the pontoon and the pontoon is lowered stepwise in the aforedescribed manner. On immersion of the pontoon, and when there is sufficient buoyancy, the moving means 53, 54 is released by disengagement and/or reversal and driving in the lowering direction so that on the one hand a damped or gradual immersion of the barge is obtained and on the other hand the pontoon is released or relieved of the barge at a time which is determined by movement of the water. This is important to insure that the barge cannot impact repeatedly against the pontoon during disengagement therefrom.

The picking up and launching of barges is preferably effected by water-controlled signal generating devices or detectors which perform or initiate switching as well as reversing operations and retraction movements by means of mechanical and/or hydraulic couplings and ratchet devices which constitute specially designed seaway compensating means. Such operations are assisted by flooding of the pontoon during lowering and by blowing or inflating the pontoon during lifting. If necessary, such flooding and/or inflating of the pontoon can be synchronized with operation of the aforementioned seaway compensating devices and their controls.

The moving means including the frames 47, 49 and the cylinder-piston units 53, 54 can be operated with considerable savings in energy. Also, the lifting range of the units 53, 54 can be made short because the pontoon 21 can be raised or lowered in two, three or more stages or steps. As stated before, the catch bolts or like locking devices can be inserted into and withdrawn from the openings 51 by automatic control devices.

The feature that the pontoon 21 can be flooded is of particular importance during launching or pickup of barges in rough waters. Thus, after the barge is first floated after launching the pontoon, the pontoon can be submerged in response to flooding of its inflatable portion so that it is immediately separated from the floating barge. This prevents a severe impact of the barge on the pontoon at the next wave trough which might be deeper than the trough in which the barge is deposited during floating.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A cargo ship, particularly a barge carrier, comprising a hull having a stern portion; a pontoon mounted in said stern portion for movement between a loading position in which it contacts the water and a stowed position in which it is located above the water surface, said pontoon comprising an inflatable portion and means for permitting admission and evacuation of air from said inflatable portion; and moving means operative to move the pontoon between said positions.

2. A cargo ship as defined in claim 1, wherein said moving means comprises at least one seaway compensating device.

3. A cargo ship as defined in claim 1, wherein said hull further comprises a deck and wherein said lifting means comprises a portal crane extending transversely of said deck and movable lengthwise of said deck toward and away from said stern portion.

4. A cargo ship as defined in claim 1, wherein said stern portion comprises a pair of rearwardly projecting extensions supporting said pontoon and flanking a loading zone in which the pontoon is movable between said stowed and loading positions thereof.

5. A cargo ship, particularly a barge carrier, comprising a hull having a stern portion; a pontoon mounted in said stern portion for movement between a loading position in which it contacts the water and a stowed position in which it is located above the water surface, said pontoon having a cargo supporting surface; moving means operative to move said pontoon between said positions; lifting means mounted on said hull for transferring cargo onto and from said cargo supporting surface in said stowed position of said pontoon; and coupling means for holding cargo against movement with reference to said surface.

6. A cargo ship as defined in claim 1, wherein said inflatable portion is arranged to be flooded in response to evacuation of air in loading position of said pontoon.

7. A cargo ship as defined in claim 1, wherein the operation of said moving means is controlled by relative and common movements of cargo and pontoon in loading position of the pontoon.

8. A cargo ship as defined in claim 1, wherein said pontoon has a cargo-supporting surface provided with cushioning means.

9. A cargo ship as defined in claim 8, wherein said cushioning means comprises elastic buffers.

10. A cargo ship as defined in claim 1, wherein said pontoon has a cargo-supporting surface and fender means partially surrounding said surface.

11. A cargo ship, particularly a barge carrier, comprising a hull having a stern portion; a pontoon mounted in said stern portion for movement between a loading position in which it contacts the water and a stowed position in which it is located above the water surface; moving means operative to move the pontoon between said positions and comprising winches carried by said stern portion and having flexible elements connected to said pontoon; and guide means provided on said stern portion for guiding said pontoon during movement between said positions, said guide means comprising a pair of flaps mounted on said stern portion for movement between closed positions and open positions in which they flank the path of movement of said pontoon between said stowed and loading positions.

12. A cargo ship as defined in claim 5, wherein said coupling means comprises electromagnet means energizable to attract cargo on said surface to said pontoon.

13. A cargo ship as defined in claim 12, further comprising actuating means provided on said pontoon for energizing said electromagnet means in response to engagement between cargo and said surface.

14. A cargo ship as defined in claim 1, wherein said moving means comprises at least one seaway compensating winch.

15. A cargo ship as defined in claim 1, wherein said moving means comprises at least one fluid-operated seaway compensating cylinder and piston unit.

16. A cargo ship as defined in claim 15, wherein said unit comprises double-acting hydraulic cylinder means.

17. A cargo ship as defined in claim 1, further comprising guide means provided on said stern portion for guiding the pontoon during movement between said stowed and loading positions.

18. A cargo ship, particularly a barge carrier, comprising a hull having a stern portion having a pair of rearwardly projecting extensions; a pontoon mounted in said stern portion for movement between a loading position in which it contacts the water and a stowed position in which it is located above the water surface and in which said extensions flank the sides of said pontoon; moving means operative to move said pontoon between said positions; and a rear closure member mounted on said extensions and rearwardly adjacent to said pontoon in said stowed position.

19. A cargo ship as defined in claim 11, wherein said flaps have guide channels which extend vertically in said open positions thereof and wherein said pontoon comprises follower means reciprocable in said channels.

20. A cargo ship as defined in claim 11, further comprising means for moving the flaps between said open and closed positions.

21. A cargo ship as defined in claim 11, further comprising coupling means connecting said flaps to said pontoon so that the flaps respectively move to open and closed positions in response to movement of said pontoon to loading and stowed positions.

22. A cargo ship as defined in claim 21, further comprising a vertical guide member extending substantially centrally of said stern portion and located forwardly of said pontoon, said pontoon having follower means arranged to track said guide member during movement of the pontoon between said stowed and loading positions thereof.

23. A cargo ship as defined in claim 18, wherein said extensions have upper portions and said closure member extends transversely between said upper portions.

24. A cargo ship as defined in claim 1, wherein said moving means comprises a plurality of seaway compensating winches carried by said stern portion and having endless flexible elements connected with said pontoon.

25. A cargo ship as defined in claim 1, wherein said moving means comprises frame means connected with said pontoon and mounted in said stern portion for vertical movement toward and away from the water surface, and means for moving said frame means.

26. A cargo ship, particularly a barge carrier, comprising a hull having a stern portion; a pontoon mounted in said stern portion for movement between a loading position in which it contacts the water and a stowed position in which it is located above the water surface; and moving means operative to move the pontoon between said positions thereof, said moving means comprising frame means including a main frame movable with reference to said stern portion and an auxiliary frame movable with reference to said main frame and connected to said pontoon, and means for moving said frame means.

27. A cargo ship as defined in claim 26, wherein the means for moving said frame means comprises seaway compensating winches.

28. A cargo ship as defined in claim 25, wherein said stern portion comprises a pair of rearwardly projecting extensions flanking the sides of the pontoon in said stowed position thereof and having guide means for said frame means.

29. A cargo ship as defined in claim 28, wherein said frame means comprises upright members movable along said guide means.

30. A cargo ship as defined in claim 26, further comprising locking means for releasably securing said frames to said stern portion.

31. A cargo ship as defined in claim 30, wherein the means for moving said frame means comprises hydraulic means including a cylinder member and a piston member reciprocable with reference to said cylinder member, each of said members being connected with one of said frames so that the main frame can be moved with reference to the stern portion when the latter is connected with said auxiliary frame, and vice versa.

32. A cargo ship as defined in claim 30, wherein said locking means comprises removable bolts.

References Cited
UNITED STATES PATENTS

| | | | |
|---|---|---|---|
| 3,318,276 | 5/1967 | Nemec | 114—72X |
| 3,390,657 | 7/1968 | Schneider | 114—43.5 |

TRYGVE M. BLIX, Primary Examiner